United States Patent
Hattiangadi et al.

(10) Patent No.: US 10,989,321 B2
(45) Date of Patent: Apr. 27, 2021

(54) DOUBLE-CROWNED VALVE SEAT INSERT HAVING SEATING SURFACE FORMED OF HARD-FACING MATERIAL

(71) Applicant: Caterpillar Inc., Deerfield, IL (US)

(72) Inventors: Ashwin A Hattiangadi, Edwards, IL (US); Rong Qu, Dunlap, IL (US); Paul Smallidge, West Lafayette, IN (US); Karen Snelling, Lafayette, IN (US); Pay Broderson, Kiel (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/395,944

(22) Filed: Apr. 26, 2019

(65) Prior Publication Data
US 2020/0340593 A1 Oct. 29, 2020

(51) Int. Cl.
*F16K 25/00* (2006.01)
*F01L 3/22* (2006.01)
*F16K 1/42* (2006.01)

(52) U.S. Cl.
CPC .............. *F16K 25/005* (2013.01); *F01L 3/22* (2013.01); *F16K 1/42* (2013.01)

(58) Field of Classification Search
CPC ............. F16K 25/005; F16K 1/42; F01L 3/22
See application file for complete search history.

(56) References Cited

U.S. PATENT DOCUMENTS

| | | |
|---|---|---|
| 3,028,850 A | 4/1962 | Gleeson |
| 5,649,358 A * | 7/1997 | Adachi ............... F01L 3/22 29/888.4 |
| 5,745,993 A | 5/1998 | Adachi et al. |
| 5,765,520 A | 6/1998 | Adachi et al. |
| 5,954,038 A | 9/1999 | Warwick et al. |
| 6,082,317 A | 7/2000 | Takahashi et al. |
| 6,260,531 B1 | 7/2001 | Haan et al. |
| 6,318,327 B1 | 11/2001 | Takahashi et al. |

(Continued)

FOREIGN PATENT DOCUMENTS

| | | |
|---|---|---|
| CN | 201133264 Y | 10/2008 |
| CN | 201277069 Y | 7/2009 |

(Continued)

OTHER PUBLICATIONS

Rong Qu, Specification and Drawings for U.S. Appl. No. 16/188,547 Valve Seat Insert for Internal Combustion Engine Profiled to Resist Valve Recession filed Nov. 13, 2018.

(Continued)

*Primary Examiner* — Kevin A Lathers
(74) *Attorney, Agent, or Firm* — Brannon Sowers & Cracraft

(57) ABSTRACT

A valve seat insert for a gas exchange valve controlling gas exchange of a cylinder includes an insert body having an inner peripheral surface, an outer peripheral surface, and a valve seating surface structured to contact the gas exchange valve at a closed position and profiled to limit valve recession thereof. The valve seating surface includes an arrangement of linear segments and curved segments forming crowns to contact the gas exchange valve at different wear states. The valve seat insert further includes a base material, and a hard-facing material metallurgically bonded to the base material and forming the valve seating surface.

19 Claims, 5 Drawing Sheets

(56) References Cited

U.S. PATENT DOCUMENTS

| | | |
|---|---|---|
| 6,536,397 B2 | 3/2003 | Mizutani |
| 9,228,458 B2 | 1/2016 | Reinhart et al. |
| 10,731,523 B2 * | 8/2020 | Qu .................... F02M 21/023 |
| 2010/0192892 A1 | 8/2010 | Huff |
| 2013/0061827 A1 | 3/2013 | Moonen |
| 2014/0190441 A1 | 7/2014 | Chern et al. |
| 2017/0058823 A1 | 3/2017 | Hayman et al. |

FOREIGN PATENT DOCUMENTS

| | | |
|---|---|---|
| CN | 201301737 Y | 9/2009 |
| CN | 203783672 U | 8/2014 |
| CN | 103161542 B | 4/2015 |
| CN | 105422206 A | 3/2016 |
| CN | 205154289 | 4/2016 |
| EP | 0705960 | 4/1996 |
| EP | 0727565 | 8/1996 |
| EP | 0937866 | 8/1999 |
| EP | 1301693 B1 | 6/2004 |
| EP | 1301693 BI | 6/2004 |
| EP | 3000997 A1 | 3/2016 |
| FR | 3055030 | 2/2018 |
| JP | 8270417 A | 10/1996 |
| JP | H08270417 | 10/1996 |
| JP | 3715437 B2 | 11/2005 |
| JP | 2009057830 A | 3/2009 |
| JP | 2013119837 A | 6/2013 |
| KR | 2013083608 A | 7/2013 |

OTHER PUBLICATIONS

Ashwin Hattiangadi, Specification and Drawings for U.S. Appl. No. 16/188,577 Valve Seat Insert for Engine Having Double-Crowned Seating Surface Profiled for Limiting Valve Recession filed Nov. 13, 2018.

Ashwin Hattiangadi, Specification and Drawings for U.S. Appl. No. 16/352,347 Valve Seat Insert for Engine Head Having Venturi Flow Crowns and Seating Surface Profiled for Limiting Valve Recession filed Mar. 13, 2019.

* cited by examiner

US 10,989,321 B2

DOUBLE-CROWNED VALVE SEAT INSERT HAVING SEATING SURFACE FORMED OF HARD-FACING MATERIAL

TECHNICAL FIELD

The present disclosure relates generally to engine valves and associated hardware, and more particularly to an engine valve seat insert for a gas exchange valve, having a hardened valve seating surface profiled to limit valve recession.

BACKGROUND

Gas exchange valves are used in internal combustion engines to control fluid connections between a cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to open and close. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions. The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. One strategy apparently aimed at preventing the outer diameter side of a valve face from locally wearing is set forth in Japanese Patent Application Publication No. JP8270417A. According to the '417 reference, a convex surface bulging toward a seat surface of a valve face abuts against the seat surface of a valve seat to address local wear problems.

SUMMARY OF THE INVENTION

In one aspect, an engine head assembly includes an engine head having a gas exchange conduit formed therein, and a valve seat insert positioned at least partially within the engine head and defining a valve seat center axis. The engine head assembly further includes a gas exchange valve including a valve head with an outer valve face and an inner valve face, the gas exchange valve being movable between a closed valve position where the inner valve face contacts the valve seat insert, and an open valve position. The valve seat insert has an axial end surface facing the cylinder, an inner peripheral surface defining an opening fluidly between the cylinder and the gas exchange conduit, an outer peripheral surface, and a valve seating surface extending between the axial end surface and the inner peripheral surface. The valve seating surface is profiled to limit valve recession and includes, in profile, an outer curved segment radially inward of the axial end surface, an inner linear segment adjacent to the outer curved segment, and an inner curved segment. The outer curved segment forms a first crown contacted by the gas exchange valve at an early wear state, and the inner curved segment forms a second crown contacted by the gas exchange valve at a later wear state. The valve seat insert includes a base material, and a hard-facing material metallurgically bonded to the base material and forming the valve seating surface.

In another aspect, a valve seat insert for a gas exchange valve controlling gas exchange of a cylinder in an internal combustion engine includes an annular insert body defining a valve seat center axis extending between a first axial end surface structured for facing the cylinder in the internal combustion engine, and a second axial end surface. The annular insert body further has an inner peripheral surface defining an opening structured to fluidly connect the cylinder to a gas exchange conduit in an engine head, an outer peripheral surface, and a valve seating surface extending between the first axial end surface and the inner peripheral surface. The valve seating surface is profiled to limit valve recession and includes, in profile, an outer curved segment radially inward of the first axial end surface, an inner linear segment adjacent to the outer curved segment, and an inner curved segment. The outer curved segment forms a first crown for contacting the gas exchange valve at an early wear state, and the inner curved segment forms a second crown for contacting the gas exchange valve at a later wear state. The valve seat insert includes a base material, and a hard-facing material metallurgically bonded to the base material and forming the valve seating surface.

In still another aspect, a valve seat insert for a gas exchange valve controlling gas exchange of a cylinder in an internal combustion engine includes an annular insert body defining a valve seat center axis extending between a first axial end surface structured for facing a cylinder in an internal combustion engine, and a second axial end surface. The annular insert body further has an inner peripheral surface defining an opening structured to fluidly connect the cylinder to a gas exchange conduit in an engine head, an outer peripheral surface, and a valve seating surface extending between the first axial end surface and the inner peripheral surface. The valve seating surface includes a first crown, for contacting the gas exchange valve at an early wear state, a second crown positioned radially inward of the first crown, for contacting the gas exchange valve at a later wear state, and a middle seat surface that is linear in profile and extends between the first crown and the second crown. The valve seating surface is formed of a hardened material, relative to a base material of the valve seat insert, for retarding valve seat recession in response to contact with the gas exchange valve.

DETAILED DESCRIPTION

Figure 1:
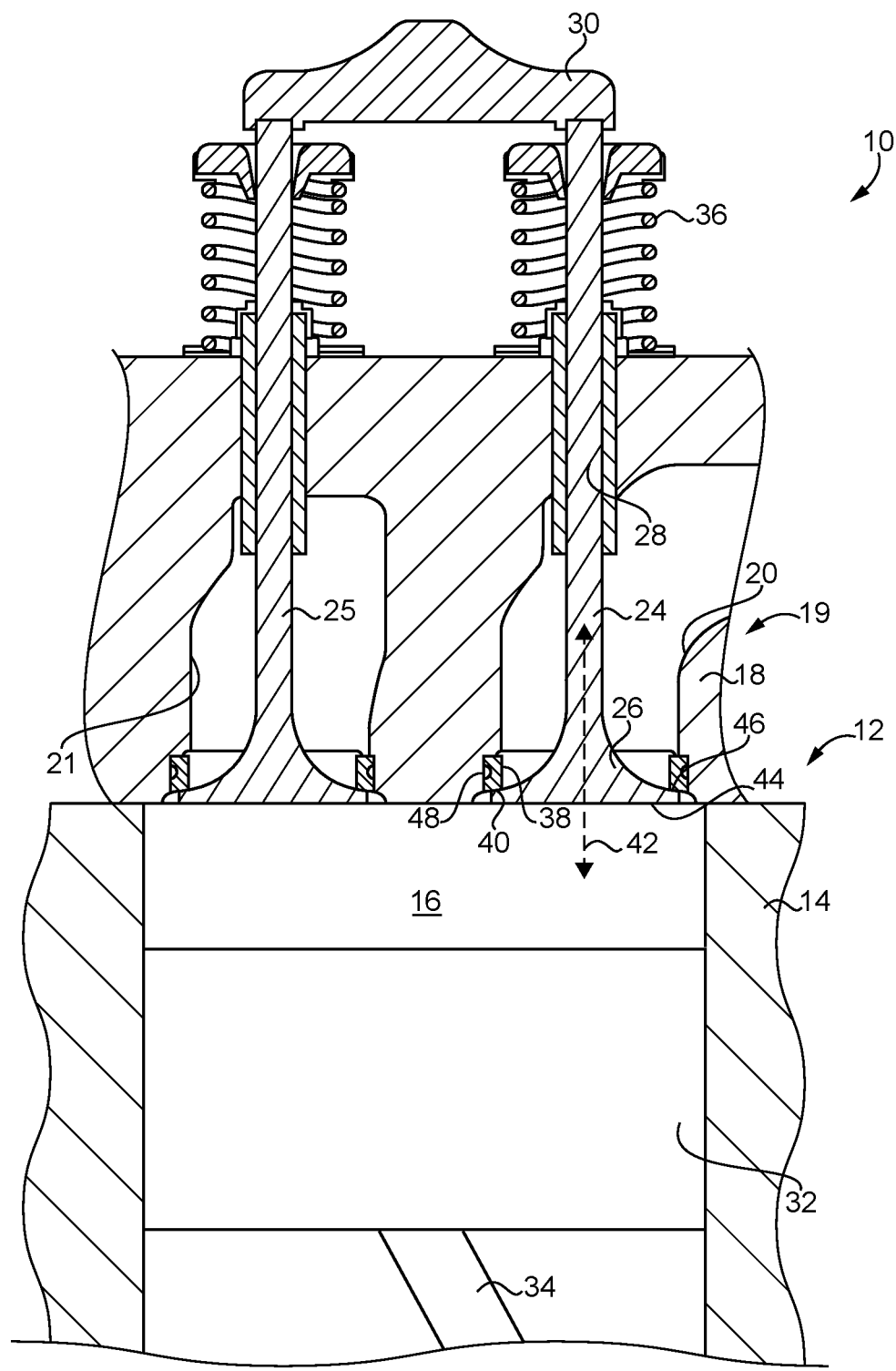
FIG. 1 is a sectioned side diagrammatic view of an internal combustion engine, according to one embodiment.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, and in one practical implementation strategy, a gaseous fuel engine that is spark or dual fuel pilot ignited and structured to operate on a fuel that is gaseous at standard temperature and pressure. Suitable gaseous fuels could include natural gas, methane, landfill gas, biogas, mixtures of these, or still others. An example liquid fuel in a dual fuel or single fuel application is diesel distillate fuel. An engine head 18 is coupled to cylinder block 14 and has a first gas exchange conduit 20 and a second gas exchange conduit 21 formed therein. Gas exchange conduits 20 and 21 could each or either be an intake conduit structured to fluidly connect with an intake manifold or an exhaust conduit structured to connect with an exhaust manifold. Gas exchange conduits 20 and 21 could thus each include intake conduits, each include exhaust conduits, or could be one of each.

A piston 32 is movable within cylinder 16 between a bottom-dead center position and a top-dead center position and is coupled to a crankshaft (not shown) by way of a connecting rod 34 in a generally conventional manner. Engine 10 could include any number of cylinders arranged in any suitable configuration such as a V-configuration, an in-line configuration, or still another. Engine head 18 could include a monolithic engine head associated with all of a plurality of individual cylinders in engine 10, or could be one of a plurality of separate engine head sections each associated with less than all of the cylinders in engine 10. Engine 10 further includes a gas exchange valve 24, and in the illustrated embodiment showing a second gas exchange valve 25, including a valve head 26 having an outer valve face or combustion face 44 and an inner valve face or sealing face 46. Together with gas exchange valves 24 and 25, engine head 18 forms an engine head assembly 19. Gas exchange valve 24 is discussed herein in the singular, however, it will be understood that the description of gas exchange valve 24 can apply by way of analogy to gas exchange valve 25 and any other gas exchange valves within engine 10. Gas exchange valves 24 and 25 are shown more or less vertically oriented with respect to a direction of reciprocation of piston 32, however, it should also be appreciated that other configurations such as gas exchange valves at diagonal orientations are contemplated herein. Gas exchange valve 24 further includes a shaft 28 connected to valve head 26 and coupled by way of a valve bridge 30 to the other gas exchange valve 25 such that gas exchange valves 24 and 25 can move together between open and closed positions, such as in response to rotation of a camshaft and movement of a rocker arm, a valve lifter assembly, and/or other equipment. A return spring 36 is coupled with gas exchange valve 24 in a generally conventional manner. Engine 10 further includes a valve seat insert 38 positioned at least partially within engine head 18 and having a valve seating surface 40 extending circumferentially around a valve seat center axis 42. Gas exchange valve 24 is movable between a closed valve position where inner valve face 46 contacts valve seating surface 40 and cylinder 16 is blocked from fluid communication with gas exchange conduit 20, and an open valve position. As will be further apparent from the following description valve seat insert 38 is structured, by way of hardened material and valve seat geometry, to retard valve recession and other wear-related phenomena over the course of a service life or service interval of engine 10.

To this end, and now with further reference to FIGS. 2-5 valve seat insert 38 may be formed by a generally annular one-piece metallic insert body 50 that is retained within engine head 18 by way of an interference fit. At top end overhaul engine head 18 can be disassembled from cylinder block 14 and a plurality of valve seat inserts substantially identical to valve seat insert 38 can be disassembled from engine head 18 as necessary for replacement. As discussed above, it has been observed that upon top end overhaul conventional gas exchange valve seats and associated gas exchange valves may have experienced an undesired extent of valve recession, meaning that upon reaching a closed position, deformation and/or wearing away of material can result in the gas exchange valve traveling into the respective valve seat insert further than desired. The excessive valve recession potentially leads to reduced gas exchange valve and overall engine performance.

Valve seating surface 40 has a valve recession-resistive profile structured to retard valve seat recession that might otherwise be observed, and typically such that greater reliability and uniformity among a plurality of different valve seat inserts in an engine can be expected. In some instances, with existing designs excessive valve seat recession in a single one of a plurality of valve seat inserts can necessitate an earlier top end overhaul than what might otherwise be desired. The valve recession-resistive profile can be understood as the profile, such as that illustrated in FIGS. 3-5, of valve seating surface 40 in a section plane that includes valve seat center axis 42, and a valve recession-resistive profile is to be analogously understood in connection with other embodiments discussed herein. Valve seating surface 40 can be understood as compound in that it includes multiple structurally distinct but functionally interrelated parts, in contrast to valve seats having a single seating surface that is contacted by a valve body. It can further be noted that valve seat center axis 42 extends between a first axial end surface 52, which will be oriented toward and is facing cylinder 16 in service, and a second axial end surface 54 of insert body 50. Insert body 50 further includes an inner peripheral surface 56, and an outer peripheral surface 58. An opening 43 is formed in and through insert body 50 by inner peripheral surface 56 to be positioned fluidly between cylinder 16 in engine 10 and gas exchange conduit 20 in engine head 18. Opening 43 can be understood as formed by a narrowest inner diameter dimension 84 defined by inner peripheral surface 56. Inner peripheral surface 56 has a non-uniform inner profile that flares outward between opening 43 and second axial end surface 54, in other words opening axially outward. Outer peripheral surface 58 has a non-uniform outer profile that dips inward between first axial end surface 52 and second axial end surface 54, and such that a coolant void 48 for circulating engine coolant around valve seat insert 38 is formed. Valve seat inserts according to the present disclosure could also be "dry" and thus formed without a coolant void. It should also be appreciated that description herein of the features or functionality of any one embodiment should be understood by way of analogy to refer to other embodiments except where otherwise indicated or apparent from the context.

Figures 2, 3:
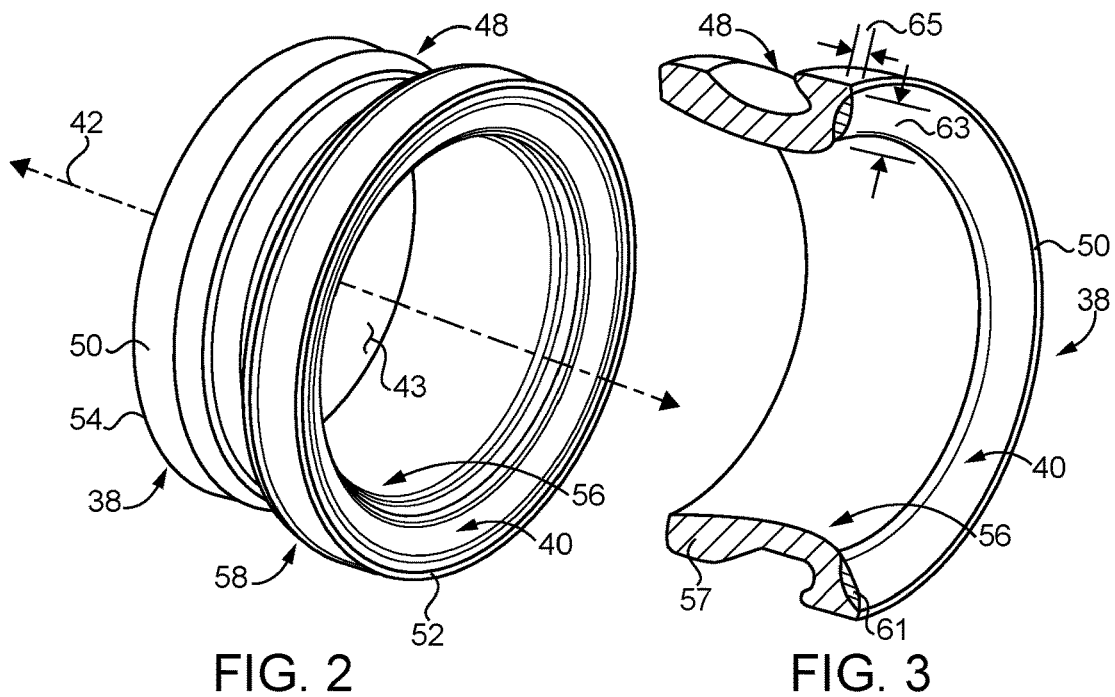
FIG. 2 is a pictorial view of a valve seat insert, according to one embodiment.
FIG. 3 is a sectioned view through the valve seat insert of FIG. 2.
Figure 4:
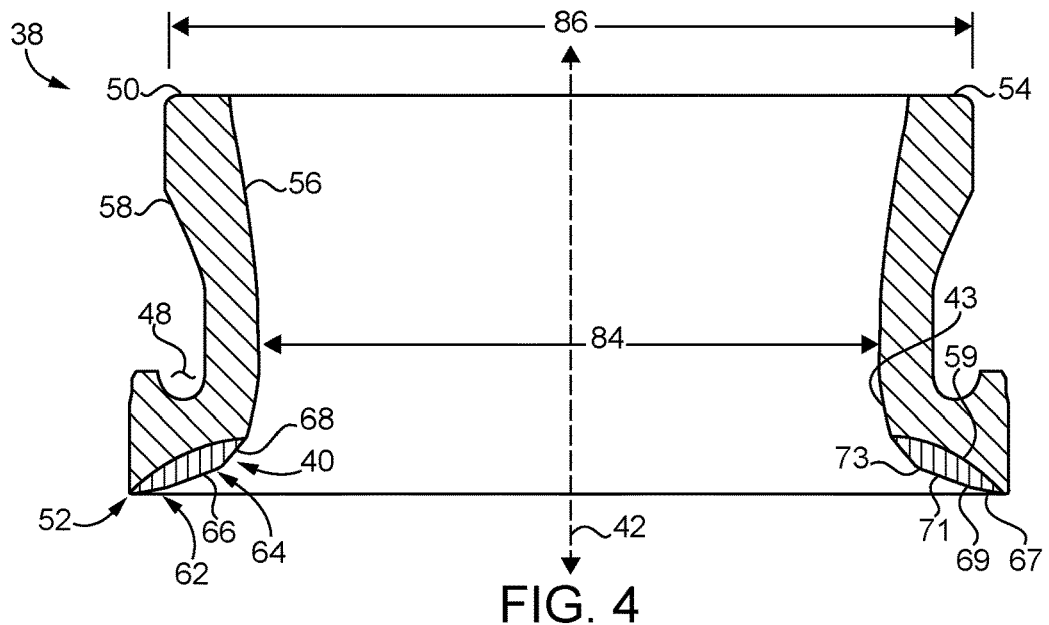
FIG. 4 is another sectioned view through the valve seat insert of FIG. 2.

Valve seat insert 38 may be formed predominantly of a base material 57, such as a base metal alloy in the nature of tool steel or the like formed as a casting. Valve seat insert 38 can also include a material that is hardened relative to base material 57, including a hard-facing material 61. Hard-facing material 61 is metallurgically bonded to base material 57 and forms valve seating surface 40. Each of first axial end surface 52 and inner peripheral surface 56 may be formed of base material 57, and hard-facing material 61 may form an annular band extending from first axial end surface 52 to inner peripheral surface 54. As shown in FIG. 3, a running length 63 of valve seating surface 40 is greater than a thickness, including a maximum thickness 65, of hard facing material 61. Valve seat insert 38 can be manufactured by, for example, casting insert body 38, and then machining a groove in the casting and filling the machined groove with hard-facing material 61. Techniques for applying hard-facing material 61 include, for example, plasma transfer welding or laser welding, welding such as by melting a wire or the like of hard-facing material 61 and permitting the molten hard-facing material 61 to solidify within the machined groove. Hard-facing material 61 can include a variety of different metallic alloys, and in one practical implementation strategy includes a cobalt-molybdenum alloy such as cobalt-molybdenum alloys commercially available under the tradename T400. Other techniques such as induction hardening could potentially be used to harden the base metal alloy from which insert body 50 is formed. Running length 63 can be formed by different outer and inner curved and linear profile segments of valve seating surface 40 as further discussed herein. In one practical implementation strategy, thickness 65 may be from about 1.5 millimeters to about 2.0 millimeters.

Valve seat insert 38, namely insert body 50, can also include a weld interface 59 between base material 57 and hard facing material 61 and having, in profile, a curved shape. Curved weld interface 59, corresponding generally to a shape of the groove formed to prepare insert body 50 for hard-facing, advances, in net, radially inward and axially inward from first axial end surface 52 to inner peripheral surface 54. Likewise, valve seating surface 40 advances, in net, radially inward and axially inward from first axial end surface 52 to inner peripheral surface 54. It can therefore be noted that base material 57 may form an axially outermost surface of insert body 50. An entirety of insert body 50 but for hard-facing material 61 may be formed of base material 57.

Returning to the geometry of valve seating surface 40, the valve recession-resistive profile is formed by an outer curved segment 69 forming a first crown 62 contacted by valve head 26 as further described herein at an early wear state or stage of valve head 26 and valve seat insert 38, an inner curved segment 73 forming a second crown 64 contacted by valve head 26 at a later wear state or stage of valve head 26 and valve seat insert 38, and an inner linear segment 71. Outer curved segment 69 is radially inward of first axial end surface 52, and inner linear segment 71 is adjacent to each of and adjoins each of outer curved segment 69 and inner curved segment 73 and is blended with each. As used herein the terms "blended" or "transitioning" should be understood to mean that an endpoint of one linear or curvilinear segment is the endpoint of an adjoining linear or curvilinear segment. An outer linear segment 67 may extend between first axial end surface 52 and outer curved segment 69. Inner linear segment 71 is formed by a middle seat surface 66; linear in profile, extending between first crown 62 and second crown 64. The terms "early" and "later" are used herein in a relative sense in relation to each other. Thus, "early" does not necessarily mean initial or new, and "later" does not necessarily mean used or old, however, in some instances such descriptions could be accurate. Valve seat insert 38 may further include a chamfer 68 located adjacent to second crown 64. Second crown 64 may be blended with chamfer 68, and first crown 62 may be blended with outer linear segment 67.

In an implementation, outer curved segment 69 and thus first crown 62 is formed by a radius having a first size, and inner curved segment 73 and thus second crown 64 is formed by a radius having a second size, and the first size is greater than the second size. Radiuses described herein can be a single radius or multiple adjoining radiuses that vary in size. The sizes disclosed herein for the subject curved segments and/or crowns refer to the magnitude of the radius of a circle that is defined by the curved physical structures forming outer curved segment 69 and inner curved segment 73. The width of inner linear segment 71 and thus middle seat surface 66 may be greater than a width of first axial end surface 52. The size of the radius forming outer curved segment 69 and thus first crown 62 may be about 6 millimeters or less, and in the embodiment of FIGS. 2-5 may be about 2 millimeters. The size of the radius forming second crown 64 may be from about 0.4 millimeters to about 3 millimeters, and in the embodiment of FIGS. 2-7 may be about 1 millimeter. A size of chamfer 68 may be about 2.2 millimeters. As used herein, the term "about" can be understood in the context of conventional rounding to a consistent number of significant digits. Accordingly, "about 2" means from 1.5 to 2.4, "about 2.0" means from 1.95 to 2.04, and so on. Where the term "about" is not used in association with a quantity or a range then that quantity or range which is expressed is intended to be exact within manufacturing tolerances.

Figure 5:
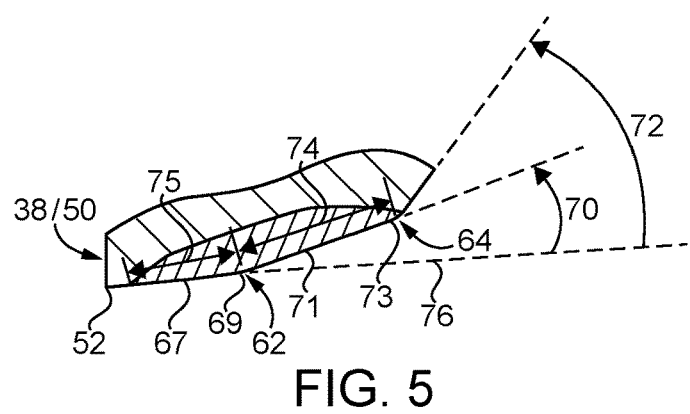
FIG. 5 is a detail view of a portion of the valve seat insert of FIG. 4.

Middle seat surface 66 is further understood to define a seat angle 70 relative to a plane 76 shown in FIG. 5 that is oriented normal to valve seat center axis 42. Seat angle 70 may be less than 20°, and typically between 19° and 20°. Middle seat surface 66 has a width 74 between first crown 62 and second crown 64 that is greater than 3 millimeters, and typically between 3 millimeters and 4 millimeters. In an implementation, seat angle 70 is about 19.6°, and width 74 is about 3.6 millimeters. A break-in face contact width of valve seat insert 38 may be equal to or just slightly larger than width 74 and could be between 3 millimeters and 6 millimeters, as initial full face contact between valve seating surface 40 and inner valve face 46 includes contact between inner valve face 46 and all of middle seat surface 66 plus some contact with first crown 62. The break-in face contact width as discussed herein in connection with valve seat insert 38 and the other valve seat inserts of the present disclosure is a structural attribute of the associated valve seating surface. Inner diameter dimension 84 at opening 43 may be about 42 millimeters. An outer diameter dimension 86 at or close to second axial end surface 54 may be about 55 millimeters. Insert body 50 may be wider in radial directions than it is long in axial directions.

Figure 6:
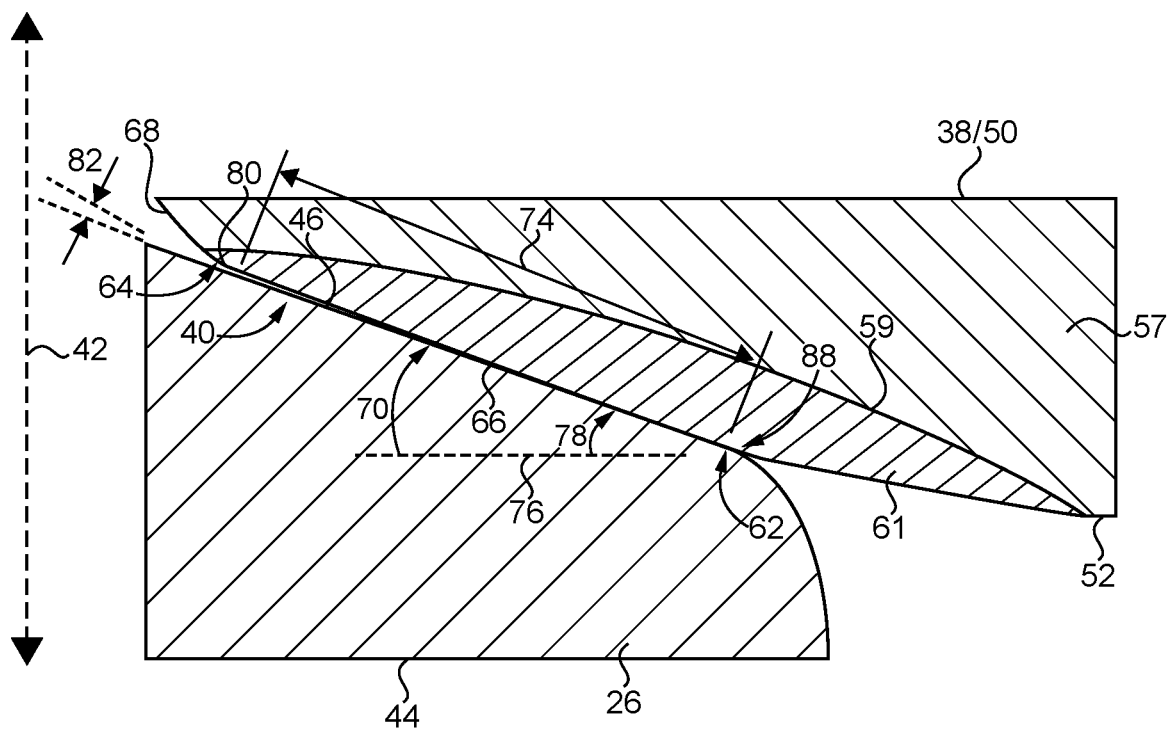
FIG. 6 is a sectioned side diagrammatic view of a valve seat insert and gas exchange valve at an early wear state, according to one embodiment.

Referring also now to FIG. 6, there is shown valve seat insert 38 as it might appear at an early wear state or stage of valve head 26 and valve seat insert 38. It can be seen that inner valve face 46 overhangs middle seat surface 66, meaning that inner valve face 46 extends radially outward and axially outward past a point at which middle seat surface 66 transitions with first crown 62. As used herein, the term "axially outward" can be understood to mean away from a midpoint of a line segment of valve seat center axis 42 corresponding to a full axial length of insert body 50, with "axially inward" meant to refer to an opposite direction toward that midpoint. "Radially inward" and "radially outward" are terms used generally conventionally. Inner valve face 46 defines a valve angle 78 relative to plane 76. Seat angle 70 is larger than valve angle 78, such that first crown 62 forms a contact band 88 with inner valve face 46 at the closed position approximately as shown in FIG. 6 and a starting face clearance 80 extends radially inward and axially inward from contact band 88. Contact band 88 will be annular, and when the components are first placed in service can be or be close to a line contact pattern. It will thus be understood that outer seat face 66 and inner valve face 46 may be very close to one another, but nominally not touching except where first crown 62 contacts overhanging inner valve face 46 when the components are first placed in service. From the early wear configuration shown in FIG. 6, deformation and wear of the components can occur such that the pattern of contact changes, and contact band 88 advances and enlarges radially inward and axially inward.

As noted above, seat angle 70 may be about 19.6°. Valve angle 78 may be about 19.3°, and seat angle 70 and valve angle 78 may thus together define an interference angle 82. Interference angle 82 may be understood as an angle formed by starting face clearance 80 between middle seat surface 66 and inner valve face 46 when the components are first placed in service, and gas exchange valve 24 is closed. It will also be understood that shortly after or even upon being placed into service, contact of valve head 26 with valve seat insert 38 can cause valve head 26 to deform such that full face contact between middle seat surface 66 and inner valve face 46 occurs along full face width 74. Interference angle 82 may be about 0.35° when the components are first placed in service, and can eventually be expected to reduce to 0° as the components break-in.

Figure 7:
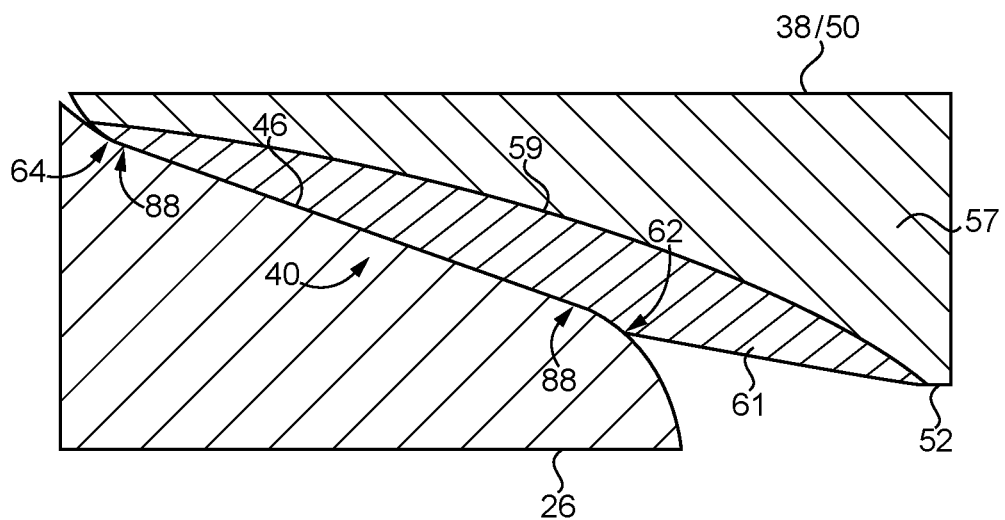
FIG. 7 is a sectioned side diagrammatic view of a valve seat insert and gas exchange valve at a later wear state, according to one embodiment.

Referring now to FIG. 7, there is shown valve head 26 and valve seat insert 38 as they might appear at a later wear stage or state, in which it can be seen that valve head 26 has begun to recess into valve seat insert 38. At the state depicted in FIG. 7 contact band 88 extends substantially across an entirety of outer seat face 46 such that full face contact occurs, and with second crown 64 now beginning to contact valve head 26. From the state depicted in FIG. 7 further valve recession can be expected over time albeit at a slower rate than what might be observed in a known design. In valve seat inserts profiled according to certain known designs, relatively sharp corners between or adjacent to valve seat surfaces were often provided. This geometry would tend to provide less resistance to valve recession due to a greater tendency to dig or cut into an inner valve face, whereas in the present design analogous contact can be cushioned. The larger interference angle of certain known designs, which could be as much as 1°, would also not enable a valve head to as readily deform or wear to a state of full face contact with the corresponding valve seat insert as does a valve seat insert and gas exchange valve according to the present disclosure. Finally, a lesser full face width of a valve seating surface in known designs, about 20° less than full face width 74 in some instances, would typically provide less surface area and contact length for distributing pressure.

Figure 8:
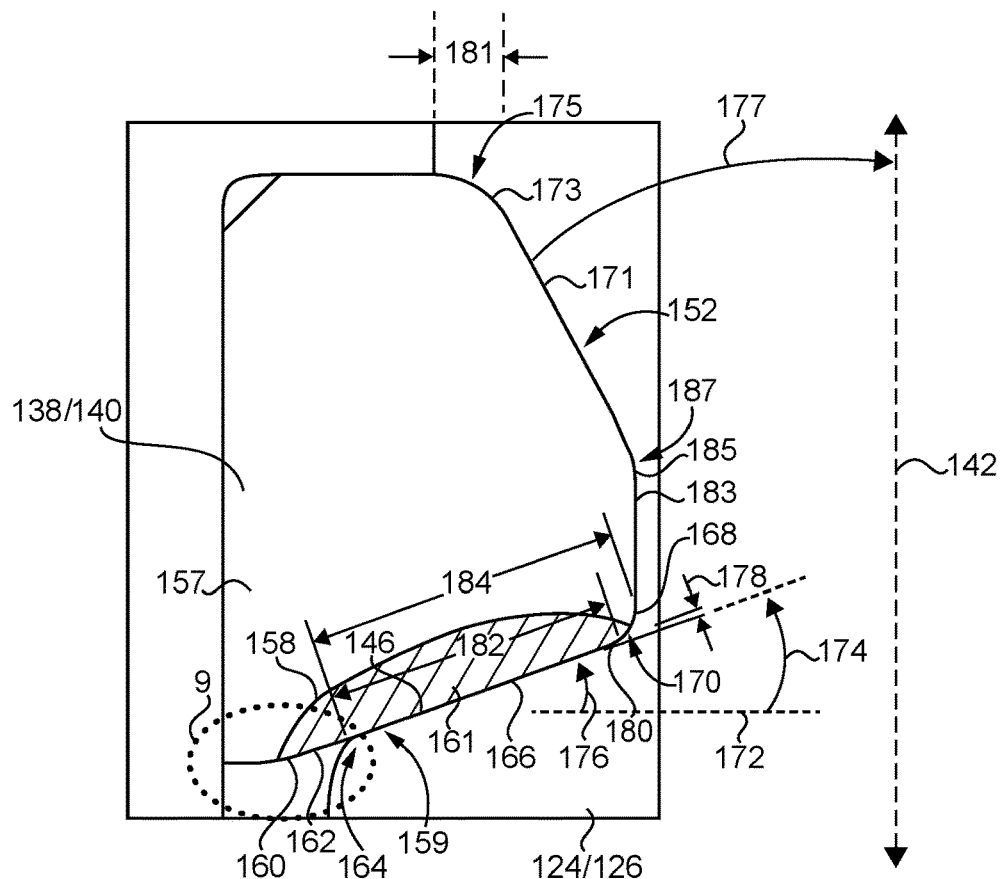
FIG. 8 is a partially sectioned side diagrammatic view of portions of a gas exchange valve and valve seat insert, according to one embodiment.
Figure 9:
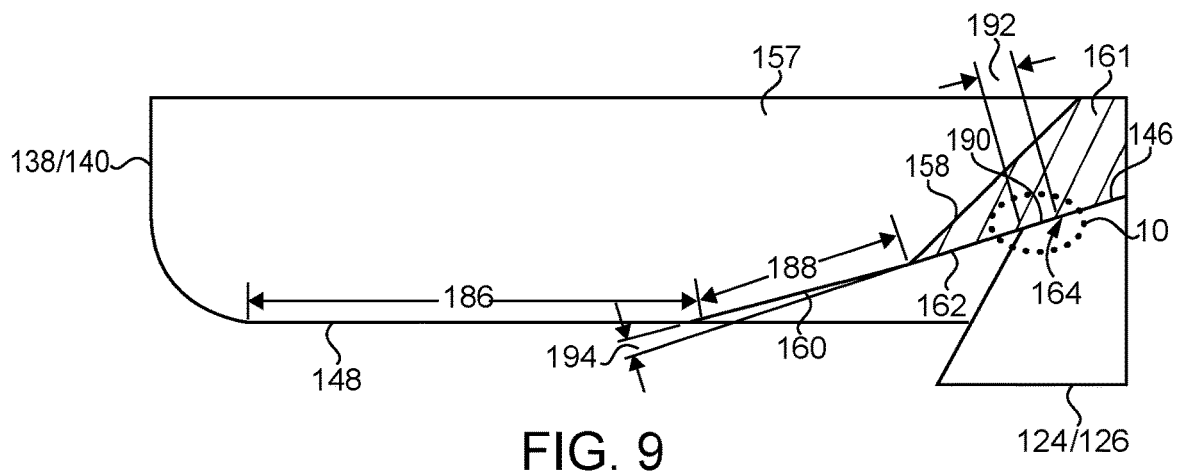
FIG. 9 is a detail view taken from circle 9 of FIG. 8.
Figure 10:
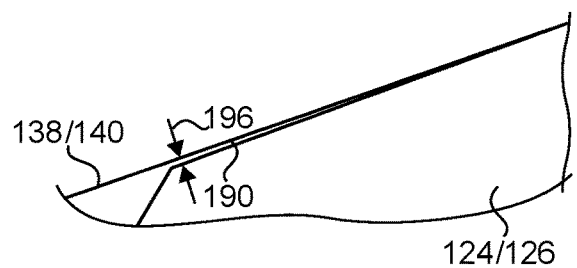
FIG. 10 is a detail view taken from circle 10 of FIG. 9.

Referring now to FIGS. 8-10, there is shown another valve seat insert 138 structured to slow and influence the progression of certain wear modes resulting from contact with a gas exchange valve 124 having a valve head 126, similar to the foregoing embodiment, but having certain differences. Valve seat insert 138 could include an intake valve seat insert, although it is not limited as such. Gas exchange valve 124 has an inner valve face 146. Valve seat insert 138 includes a valve seating surface 159 profiled to limit valve recession and includes, in profile, an outer linear segment 160, an outer curved segment 162 adjoining and blended with outer linear segment 160, an inner linear segment 166 adjacent to, adjoining and blended with outer curved segment 162, and an inner curved segment 168 adjacent, adjoining and blended with inner linear segment 66. Inner linear segment 166 may be understood to be formed by a middle seat surface that is linear in profile. Outer curved segment 162 forms a first crown 164 for contacting gas exchange valve 124 at an early wear state, and inner curved segment 168 forms a second crown 170 radially inward and axially inward of first crown 164, for contacting gas exchange valve 124 at a later wear state.

Initial contact when valve seat insert 138 and gas exchange valve 124 are first placed in service may occur at an annular contact band between inner valve face 146 and first crown 164. As the respective components deform and wear they may transition from an early wear state where the components have a line contact, or nearly line contact, band formed between inner valve face 146 and first crown 164, to a later wear state where inner valve face 146 is substantially parallel to and in contact with part of second crown 170 and inner linear segment 166, and then to a still later wear state where full face contact is maintained and additional contact occurs with second crown 170.

Valve seat insert 138 and insert body 140 also include a base material 157, and a hard-facing material 161 metallurgically bonded to base material 147 and forming valve seating surface 159. A curved weld interface 158 is formed by base material 157 and hard-facing material 161. Other structural as well as design and manufacturing attributes of valve seat insert 138 respecting base material 147 and hard-facing material 161 can be substantially identical to those discussed with regard to the foregoing embodiment. For instance, it can be noted that each of curved weld interface 158 and valve seating surface 159 advances, in net, radially inward and axially inward from a first axial end surface 148 to an inner peripheral surface 152. A maximum depth of hard-facing material may be from about 1.5 millimeters to about 2.0 millimeters.

Inner peripheral surface 152 also includes, in profile, a sloping segment 171 that is linear and extends between inner curved segment 162 forming second crown 170 and an upper curved segment 173 forming an incoming flow crown 175. Upper curved segment 173 and thus incoming flow crown 175 may be formed by a radius having a size from about 1 millimeter to about 3 millimeters. Sloping segment 171 may extend circumferentially around valve seat center axis 142 and is oriented at a venturi angle 177 relative to axis 142 that may be circumferentially uniform about valve seat center axis 142. Among the various embodiments contemplated herein, venturi angle 177 may be from about 10° to about 30°, and may be about 14° in valve seat insert 138. Sloping segment 171 may further transition with upper curved segment 173 and with a lower curved segment 185 that forms a second flow crown 187. A vertical segment 183 is oriented parallel to valve seat center axis 142 and transitions with each of lower curved segment 185 and inner curved segment 168. A running length of vertical segment 183 may be about 1.5 millimeters. Other embodiments could include only a single flow crown analogous to incoming flow crown 175, with a generally analogous sloping segment extending between an incoming flow crown and a second crown for contacting a valve head and adjoining or forming part of a valve seating surface. Incoming flow crown 175, and upper curved segment 173, is set off radially inward (from an associated engine head) a set off distance 181 that may be greater than the size of the radius forming upper curved segment 173 and incoming flow crown 175. A size of the radius forming outer curved segment 162 and thus first crown 164 may be less than 6 millimeters, and in the embodiment of FIGS. 8-10 may be from about 3 millimeters to about 6 millimeters. A size of the radius forming inner curved segment 168 and thus second crown 170 may be from about 0.4 millimeters to about 3 millimeters.

In the illustration of FIG. 8 it can also be seen that an inner valve face 146 is oriented at a valve angle 174 relative to a plane 172 that is oriented normal to valve seat center axis 142. Inner linear segment 166 is oriented at a seat angle 176 relative to plane 172 that is larger than valve angle 174. An interference angle 178 is formed by inner valve face 146 and inner linear segment 166, and a clearance 180 is formed between inner valve face 146 and inner linear segment 166. Valve angle 174 may differ from seat angle 176 by about 0.4° to about 0.6°. Seat angle 176 may be from about 20° to about 30°, and seat angle 176 may be about 20° in one practical implementation. Interference angle 178 may be about 0.37°.

Referring also now to FIGS. 9 and 10, a second clearance 190 may be formed between inner valve face 146 and outer curved segment 162 and extends radially outward and axially outward from a contact band formed at the early wear state approximately as depicted, between inner valve face 146 and first crown 164. A size of second clearance 190 may include a facing length 192 that is about 0.1 millimeters, between inner valve face 146 and outer curved segment 162 of valve seating surface 159. Facing length 192 can be understood as the distance from the contact band to an outer edge of valve head 126. Another angle 194 may be formed between outer linear segment 160 and inner linear segment 166 and may be about 5°. An edge clearance distance is shown at 196 and indicates a gap distance to outer curved segment 162 at an outer edge of inner valve face 146, and may be about 0.00056 millimeters.

Also shown in FIG. 8 is a full seating width dimension 184 or theoretical full seating width of valve seat insert 138 that may eventually become available as wear between the components progresses, in comparison to a break-in face contact width 182 obtained when full face contact initially occurs. A width of inner linear segment 166 between outer curved segment 162 and inner curved segment 168 is greater than 3 millimeters, and typically between 3 millimeters and 6 millimeters. Break-in face contact width 182 may be from about 4 millimeters to about 5 millimeters. An end face width of first axial end surface 148 is shown at 186 in FIG. 9 and may be about 1 millimeter. A linear segment width of outer linear segment 160 is shown at 188 and may be about 0.5 millimeters.

Figure 11:
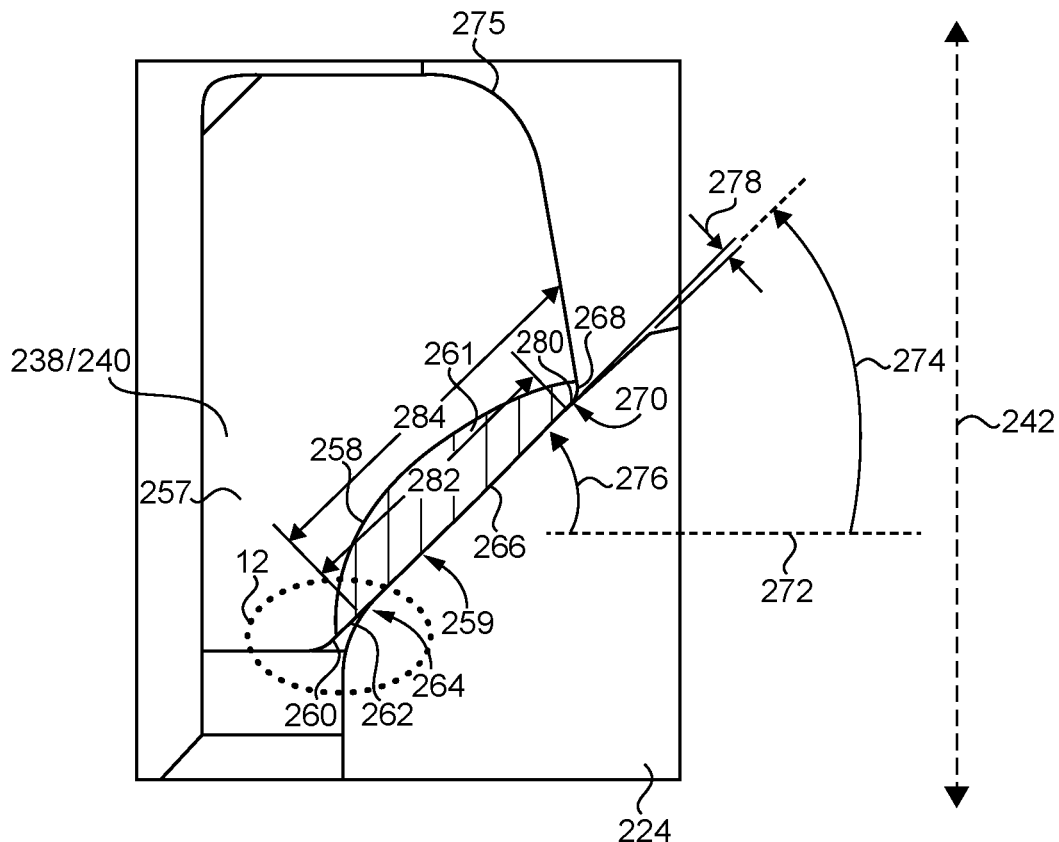
FIG. 11 is a sectioned side diagrammatic view of portions of a gas exchange valve and valve seat insert, according to one embodiment.
Figure 12:
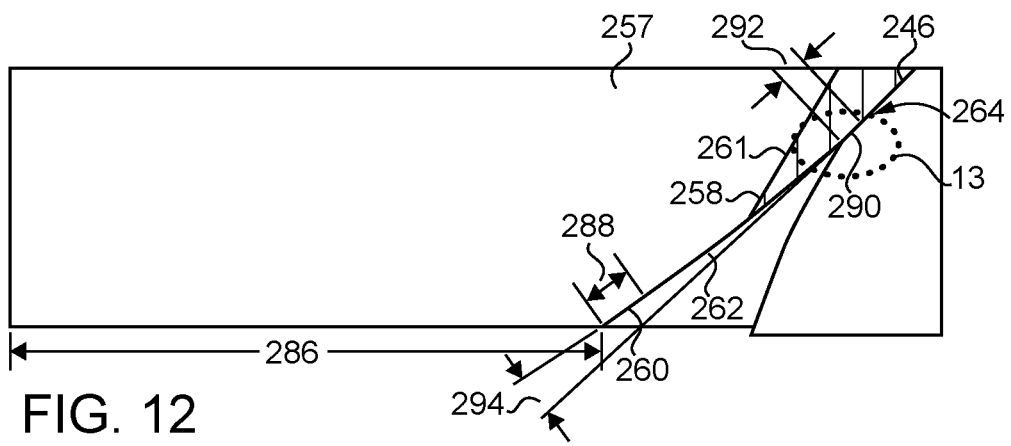
FIG. 12 is a detail view taken from circle 12 of FIG. 11.
Figure 13:
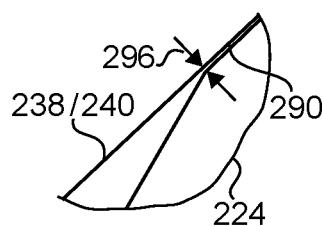
FIG. 13 is a detail view taken from circle 13 of FIG. 12.

Turning now to FIG. 11, there are shown features of a valve seat insert 238 and an insert body 240 according to another embodiment in contact with a gas exchange valve 224. Valve seat insert 238 includes a valve seating surface 259 profiled to limit valve recession and includes, in profile, an outer linear segment 260 adjacent to a first axial end surface (not numbered), an outer curved segment 262 adjacent to outer linear segment 260 and forming a first crown 264 contacted by gas exchange valve 224 at an early wear state. Valve seating surface 259 further includes an inner linear segment 166 adjacent to outer curved segment 262, and an inner curved segment 268 adjacent to inner linear segment 166 and forming a second crown 270 contacted by gas exchange valve 224 at a later wear state. An incoming flow crown is shown at 275. An inner valve face 246 is oriented at a valve angle 274 relative to a plane 272 normal to a valve seat center axis 242. Inner linear segment 266 is oriented at a seat angle 276 relative to plane 272 that is larger than valve angle 274 such that an interference angle 278 is formed. A clearance 280 is formed between gas exchange valve 224 and inner linear segment 266. Valve angle 274 may be about 44.4°. Seat angle 276 may be about 45°. Interference angle 278 may be about 0.6°. A second clearance 290, as shown in FIG. 12 and FIG. 13, extends radially outward and axially outward from a contact band between inner valve face 246 and first crown 264.

In valve seat insert 238, which can include an exhaust valve seat insert for example, a full seating width dimension 284 may be about 5.2 millimeters. A size of the radius forming outer curved segment 262 and thus first crown 264 may be less than 6 millimeters, and may be from about 3 millimeters to about 6 millimeters. A size of the radius forming inner curved segment 268 and thus second crown 270 may be from about 0.4 millimeters to about 3 millimeters. A break-in face contact width 282 may be greater than 3 millimeters, and between 3 millimeters and 6 millimeters, for example from about 4 millimeters to about 5 millimeters. A linear segment width 288 may be about 0.3 millimeters, and an end face width 286 may be about 1.88 millimeters. A clearance facing length 292 may be about 0.1 millimeters, an edge clearance 296 may be about 0.00052 millimeters. An angle 294 between outer linear segment 260 and inner linear segment 266 may be about 10°. Valve seat insert also includes base material 257, and a hard-facing material 261 metallurgically bonded to base material 257 and forming valve seating surface 259. A weld interface 158 is formed by base material 257 and hard-facing material 261. Features and functionality of hard-facing material 261 may be similar to those discussed in connection with foregoing embodiments.

INDUSTRIAL APPLICABILITY

Operation of an engine according to the present disclosure can be expected over time to result in gas exchange valve and valve seat insert wear such that the gas exchange valve and valve seat insert transition from a new or early wear state to a later wear state. Initial contact between the components can be line contact or close to line contact in the early wear state, with the gradual wearing-away of and/or deformation of material over time causing the components to assume face contact as described herein at a later wear state. Wear and valve seat recession will continue throughout the service life of the components but slowed in comparison to certain known designs based upon the use of hard-facing material and the valve recession-resistive profiles disclosed herein.

Engineers have attempted for many years to develop strategies for reducing the rate and/or manner of gas exchange valve and valve seat/valve seat insert wear, challenges compounded with continued changes to engine configuration and operating characteristics that can render designs fine-tuned for one application less well-suited to improved versions of even the same engine. Along such lines, the geometry of valve seat inserts contemplated herein with respect to valve seating and valve recession properties, and the geometry for other properties such as cooling, gas flow, and still others, as well as material properties of the valve seating surface, can be understood as a system of cross-coupled variables where modifying one aspect of valve seat insert geometry can potentially affect other aspects of valve seat insert geometry, often in unpredictable ways.

For instance, given any one valve seat insert design, wear properties might be desirably changed based on toggling such factors as seat angle, crown size, or break-in face contact width, but in response to such changes gas flow efficacy might be adversely impacted, or a redesign of the associated gas exchange valve required. As another example, in some instances an attempted design change to vary the size of a radius or the width of a surface could require a compensatory varying of the size of another radius or the width of another surface if a general size and/or shape of a valve seating surface or other structures of a valve seat insert or associated gas exchange valve is to be maintained. Moreover, use of a relatively hard material, such as hard-facing material as discussed herein can further compound design or research options, as the hard-facing material may interact with a gas exchange valve in a manner different from what might be expected using a conventional base metal alloy, for instance, especially where factors such as angles, crown size, or others are varied. According to the present disclosure, valve seat inserts can be formed within certain geometric design parameters to provide a valve seating surface profile adapted for resisting valve recession that cooperates with the use of hardened material to extend service life at least several times over known systems, as well as improve in-service wear uniformity among a plurality of valve seat inserts in both liquid-cooled or dry intake and exhaust valve applications.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine head assembly comprising:
   an engine head having a gas exchange conduit formed therein;
   a valve seat insert interference-fitted within the engine head and defining a valve seat center axis;
   a gas exchange valve including a valve head having an outer valve face and an inner valve face, and the gas exchange valve being movable between a closed valve position where the inner valve face contacts the valve seat insert, and an open valve position;
   the valve seat insert having an axial end surface facing the cylinder, an inner peripheral surface defining an opening fluidly between the cylinder and the gas exchange conduit, an outer peripheral surface, and a valve seating surface extending between the axial end surface and the inner peripheral surface;
   the valve seating surface being profiled to limit valve recession and including, in profile, an outer curved segment radially inward of the axial end surface, an inner linear segment adjacent to the outer curved segment, and an inner curved segment;
   the outer curved segment forming a first crown contacted by the gas exchange valve at an early wear state, and the inner curved segment forming a second crown contacted by the gas exchange valve at a later wear state; and
   the valve seat insert including a base material, and a hard-facing material metallurgically bonded to the base material and forming the valve seating surface.

2. The engine head assembly of claim 1 wherein each of the axial end surface and the inner peripheral surface is formed of the base material, and the hard-facing material forms an annular band extending from the axial end surface to the inner peripheral surface.

3. The engine head assembly of claim 2 wherein a running length of the valve seating surface is formed by the outer curved segment, the inner curved segment, and the inner linear segment, and the hard-facing material having a thickness that is less than the running length of the valve seating surface.

4. The engine head assembly of claim 2 wherein the valve seat insert includes a weld interface between the base material and the hard-facing material, and the weld interface includes, in profile, a curved shape.

5. The engine head assembly of claim 2 wherein the outer curved segment is formed by a first radius having a first size, and the inner curved segment is formed by a second radius having a second size, and the first size is greater than the second size.

6. The engine head assembly of claim 5 wherein the inner valve face is oriented at a valve angle relative to a plane normal to the valve seat center axis, and the inner linear segment is oriented at a seat angle relative to the plane that is larger than the valve angle, such that an interference angle is formed by the inner valve face and the inner linear segment and a clearance is formed therebetween.

7. The engine head assembly of claim 5 wherein:
   the inner peripheral surface includes, in profile, an upper curved segment forming an incoming flow crown, and a sloping segment extending between the upper curved segment and the inner curved segment; and
   the upper curved segment transitioning with the second axial end surface and the incoming flow crown being set off radially inward from the engine head, and the sloping segment being oriented at a venturi angle relative to the valve seat center axis, such that the inner peripheral surface forms a venturi to accelerate an incoming flow of gases to the cylinder.

8. A valve seat insert for a gas exchange valve controlling gas exchange of a cylinder in an internal combustion engine comprising:
an annular insert body defining a valve seat center axis extending between a first axial end surface structured for facing the cylinder in the internal combustion engine, and a second axial end surface;
the annular insert body further having an inner peripheral surface defining an opening structured to fluidly connect the cylinder to a gas exchange conduit in an engine head, an outer peripheral surface, and a valve seating surface extending between the first axial end surface and the inner peripheral surface;
the valve seating surface being profiled to limit valve recession and including, in profile, an outer curved segment radially inward of the first axial end surface, an inner linear segment adjacent to the outer curved segment, and an inner curved segment;
the outer curved segment forming a first crown, for contacting the gas exchange valve at an early wear state, and the inner curved segment forming a second crown for contacting the gas exchange valve at a later wear state; and
the valve seat insert including a base material, and a hard-facing material metallurgically bonded to the base material and forming the valve seating surface; and
the outer curved segment is formed by a radius having a first size and the inner curved segment is formed by a radius having a second size, and the first size is greater than the second size.

9. The valve seat insert of claim 8 wherein each of the first axial end surface and the inner peripheral surface is formed of the base material, and the hard-facing material extends from the first axial end surface to the inner peripheral surface.

10. The valve seat insert of claim 9 wherein the annular insert body includes, in profile, a curved weld interface between the base material and the hard-facing material, and the curved weld interface advances, in net, radially inward and axially inward from the first axial end surface to the inner peripheral surface.

11. The valve seat insert of claim 10 wherein the base material is a base metal alloy, and the hard-facing material is a cobalt-molybdenum alloy.

12. The valve seat insert of claim 8 wherein:
the inner curved segment adjoins the inner peripheral surface, and the valve seating surface further includes, in profile, an outer linear segment adjoining the first axial end surface; and
the valve seating surface advances, in net, radially inward and axially inward from the first axial end surface to the inner peripheral surface.

13. The valve seat insert of claim 8 wherein the size of the radius forming the outer curved segment is about 6 millimeters or less, and the size of the radius forming the inner curved segment is from about 0.4 millimeters to about 3 millimeters.

14. The valve seat insert of claim 13 wherein a break-in face contact width of the valve seating surface is between 3 millimeters and 6 millimeters.

15. The valve seat insert of claim 14 including an exhaust valve seat insert where the valve seating surface defines a seat angle of about 45°.

16. The valve seat insert of claim 14 including an intake valve seat insert where the valve seating surface defines a seat angle of about 20°.

17. A valve seat insert for a gas exchange valve controlling gas exchange of a cylinder in an internal combustion engine comprising:
an annular insert body defining a valve seat center axis extending between a first axial end surface structured for facing a cylinder in the internal combustion engine, and a second axial end surface;
the annular insert body further having an inner peripheral surface defining an opening structured to fluidly connect the cylinder to a gas exchange conduit in an engine head, an outer peripheral surface, and a valve seating surface extending between the first axial end surface and the inner peripheral surface;
the valve seating surface including a first crown, for contacting the gas exchange valve at an early wear state, a second crown positioned radially inward of the first crown, for contacting the gas exchange valve at a later wear state, and a middle seat surface that is linear in profile and extends between the first crown and the second crown, and the valve seating surface being formed of a hardened material, relative to a base material of the valve seat insert, for retarding valve seat recession in response to contact with the gas exchange valve; and
the inner peripheral surface is formed of the base material and includes, in profile, an upper curved segment forming an incoming flow crown, and a sloping segment oriented at a venturi angle relative to the valve seat center axis, the venturi angle opening in an axial direction of the second axial end surface, such that the inner peripheral surface forms a venturi to accelerate an incoming flow of gases through the opening in an axial direction of the first axial end surface.

18. The valve seat insert of claim 17 wherein each of the first axial end surface and the inner peripheral surface is formed of the base material, and the hardened material includes a hard-facing material forming an annular band extending from the first axial end surface to the inner peripheral surface.

19. The valve seat insert of claim 17 wherein:
the annular insert body includes a weld interface between the base material and the hard-facing material; and
each of the valve seating surface and the weld interface advances, in net, radially inward and axially inward from the axial end surface to the inner peripheral surface.

* * * * *